US009290950B2

(12) United States Patent
Cappelle

(10) Patent No.: US 9,290,950 B2
(45) Date of Patent: Mar. 22, 2016

(54) PANEL

(71) Applicant: FLOORING INDUSTRIES LIMITED, SARL, Bertrange (LU)

(72) Inventor: Mark Cappelle, Staden (BE)

(73) Assignee: FLOORING INDUSTRIES LIMITED, SARL, Bertrange (LU)

( * ) Notice: Subject to any disclaimer, the term of this patent is extended or adjusted under 35 U.S.C. 154(b) by 0 days.

(21) Appl. No.: 14/370,277

(22) PCT Filed: Nov. 16, 2012

(86) PCT No.: PCT/IB2012/056495
§ 371 (c)(1),
(2) Date: Jul. 2, 2014

(87) PCT Pub. No.: WO2013/102804
PCT Pub. Date: Jul. 11, 2013

(65) Prior Publication Data
US 2014/0366475 A1     Dec. 18, 2014

Related U.S. Application Data

(60) Provisional application No. 61/700,984, filed on Sep. 14, 2012, provisional application No. 61/664,330, filed on Jun. 26, 2012, provisional application No. 61/585,798, filed on Jan. 12, 2012.

(30) Foreign Application Priority Data

Jan. 5, 2012  (BE) .................................. 2012/0007
Jul. 6, 2012  (BE) .................................. 2012/0470

(51) Int. Cl.
*E04F 15/02* (2006.01)
*E04C 2/10* (2006.01)
(Continued)

(52) U.S. Cl.
CPC ............. *E04F 15/02038* (2013.01); *E04C 2/10* (2013.01); *E04C 2/30* (2013.01);
(Continued)

(58) Field of Classification Search
CPC .......... E04B 1/61; E04B 2/06; E04B 2/7425; E04B 2/7448; E04F 13/0801; E04F 15/02022; E04F 15/02038; E04F 15/02005; E04F 15/02; F16B 7/00
USPC ........................................................ 52/588.1
See application file for complete search history.

(56) References Cited

U.S. PATENT DOCUMENTS 6,647,690 B1   11/2003   Martensson
6,769,835 B2    8/2004   Stridsman
(Continued)

FOREIGN PATENT DOCUMENTS

CA            991373 A1    6/1976
DE         200 08 708 U1   9/2000
(Continued)

OTHER PUBLICATIONS

Search Report of Belgium Application No. BE 201200007, filed Jan. 5, 2012.
(Continued)

*Primary Examiner* — Patrick Maestri
(74) *Attorney, Agent, or Firm* — Workman Nydegger

(57) ABSTRACT

A panel, with a horizontally and vertically active locking system, allows two of such floor panels to be connected to each other at their sides by providing one of these floor panels, by means of a downward movement, in the other panel. The vertically active locking element comprises a locking element in the form of an insert. The locking element comprises at least a pivotable lock-up body and an attachment portion. The locking element comprises a bending zone including a first boundary surface with the lock-up body as well as a second boundary surface with the attachment portion. The lock-up body and the attachment portion, in the non-coupled condition, extend underneath each other.

20 Claims, 7 Drawing Sheets

(51) Int. Cl.
*E04C 2/30* (2006.01)
*E04F 15/04* (2006.01)
*F16B 5/00* (2006.01)
*E04C 2/00* (2006.01)

(52) U.S. Cl.
CPC .......... *E04F 15/02* (2013.01); *E04F 15/02005* (2013.01); *E04F 15/02022* (2013.01); *E04F 15/04* (2013.01); *E04C 2002/004* (2013.01); *E04F 2015/02122* (2013.01); *E04F 2201/0138* (2013.01); *E04F 2201/0146* (2013.01); *E04F 2201/0523* (2013.01); *F16B 5/008* (2013.01); *F16B 5/0056* (2013.01)

(56) References Cited

U.S. PATENT DOCUMENTS

| | | |
|---|---|---|
| 6,854,235 B2 | 2/2005 | Martensson |
| 7,451,578 B2 | 11/2008 | Hannig |
| 7,603,826 B1 | 10/2009 | Moebus |
| 7,621,092 B2 | 11/2009 | Groeke et al. |
| 7,980,039 B2 | 7/2011 | Groeke et al. |
| 7,980,043 B2 | 7/2011 | Moebus |
| 8,024,904 B2 | 9/2011 | Hannig |
| 8,091,238 B2 | 1/2012 | Hannig |
| 8,132,384 B2 | 3/2012 | Hannig |
| 8,631,621 B2 | 1/2014 | Hannig |
| 2003/0180091 A1 | 9/2003 | Stridsman |
| 2004/0068954 A1 | 4/2004 | Martensson |
| 2004/0211143 A1 | 10/2004 | Hanning |
| 2007/0006543 A1 | 1/2007 | Engstrom |
| 2007/0193178 A1 | 8/2007 | Groeke et al. |
| 2008/0010938 A1 | 1/2008 | Hannig |
| 2008/0236088 A1 | 10/2008 | Hannig |
| 2009/0100782 A1 | 4/2009 | Groeke et al. |
| 2009/0249733 A1 | 10/2009 | Moebus |
| 2010/0281803 A1* | 11/2010 | Cappelle ............ 52/309.1 |
| 2011/0088346 A1 | 4/2011 | Hannig |
| 2011/0271632 A1 | 11/2011 | Cappelle et al. |
| 2012/0011796 A1 | 1/2012 | Hannig |
| 2012/0073235 A1 | 3/2012 | Hannig |

FOREIGN PATENT DOCUMENTS

| | | |
|---|---|---|
| DE | 201 12 474 U1 | 12/2002 |
| DE | 299 24 454 U1 | 5/2003 |
| DE | 10 2004 055 951 A1 | 7/2005 |
| DE | 10 2004 001 363 A1 | 8/2005 |
| DE | 10 2005 002 297 A1 | 8/2005 |
| DE | 20 2007 000 310 U1 | 4/2007 |
| DE | 10 2006 011 887 A1 | 7/2007 |
| DE | 20 2009 004 530 U1 | 6/2009 |
| EP | 1 350 904 A2 | 10/2003 |
| EP | 1 282 752 B1 | 10/2004 |
| EP | 1 159 497 B1 | 9/2005 |
| EP | 1 415 056 B1 | 1/2006 |
| EP | 1 818 478 A1 | 8/2007 |
| EP | 2 034 106 A1 | 3/2009 |
| JP | H07-300979 A | 11/1995 |
| SE | 515 324 C2 | 7/2001 |
| WO | 97/47834 A1 | 12/1997 |
| WO | 2004/079130 A1 | 9/2004 |
| WO | 2005/054599 A1 | 6/2005 |
| WO | 2006/043893 A1 | 4/2006 |
| WO | 2006/104436 A1 | 10/2006 |
| WO | 2007/008139 A1 | 1/2007 |
| WO | 2007/079845 A1 | 7/2007 |
| WO | 2009/066153 A2 | 5/2009 |
| WO | 2010/082171 A2 | 7/2010 |

OTHER PUBLICATIONS

Search Report of Belgium Application No. BE 2012/00470, filed Jul. 6, 2012.
International Search Report of International Application No. PCT/IB2012/056495, mailed Nov. 8, 2013.

* cited by examiner

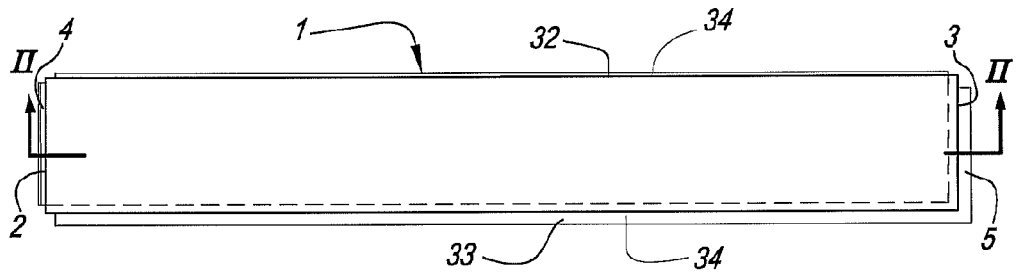
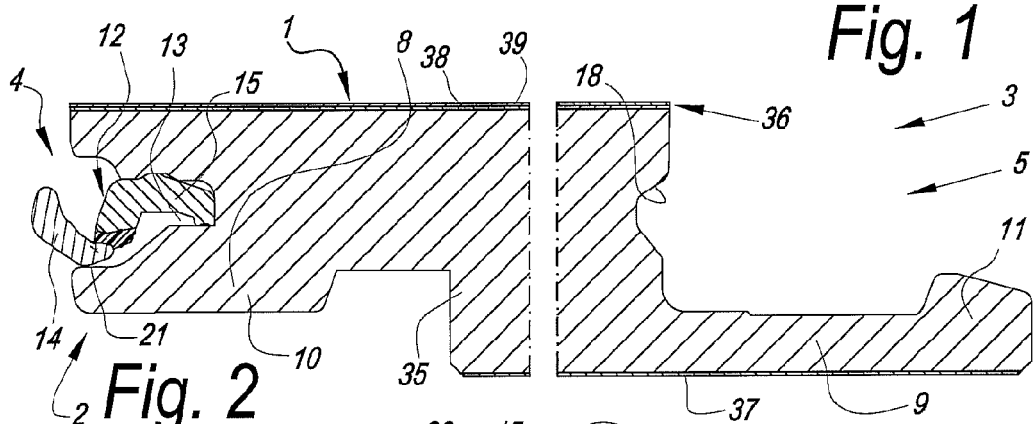
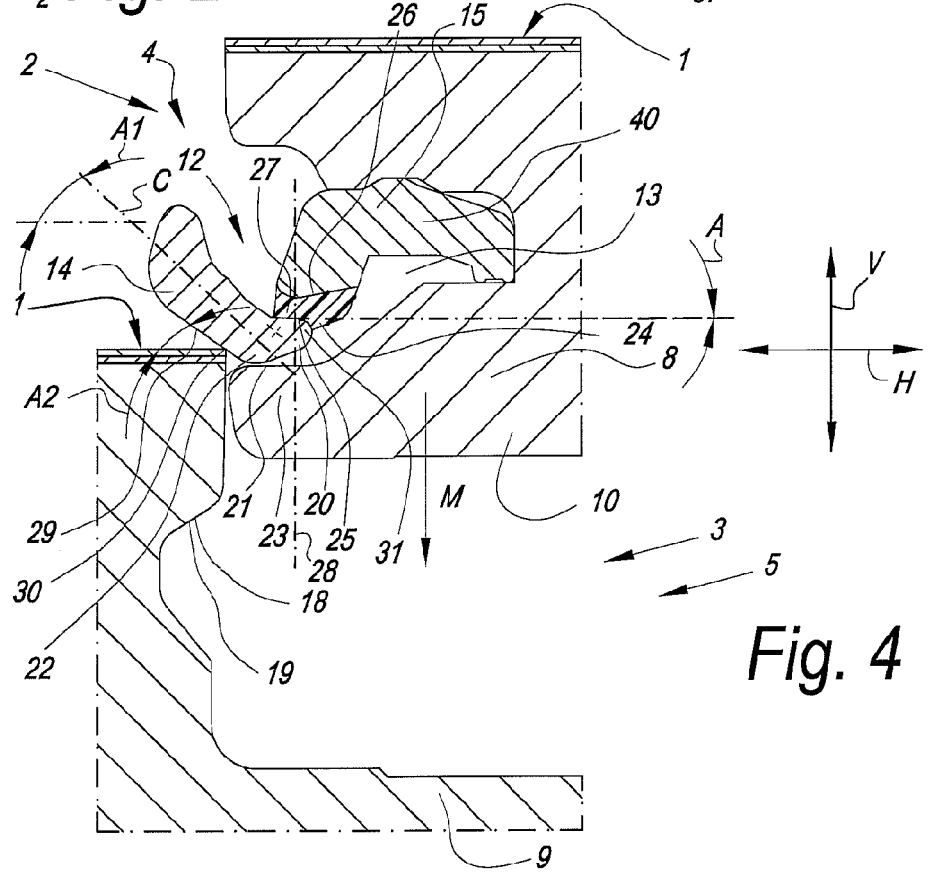

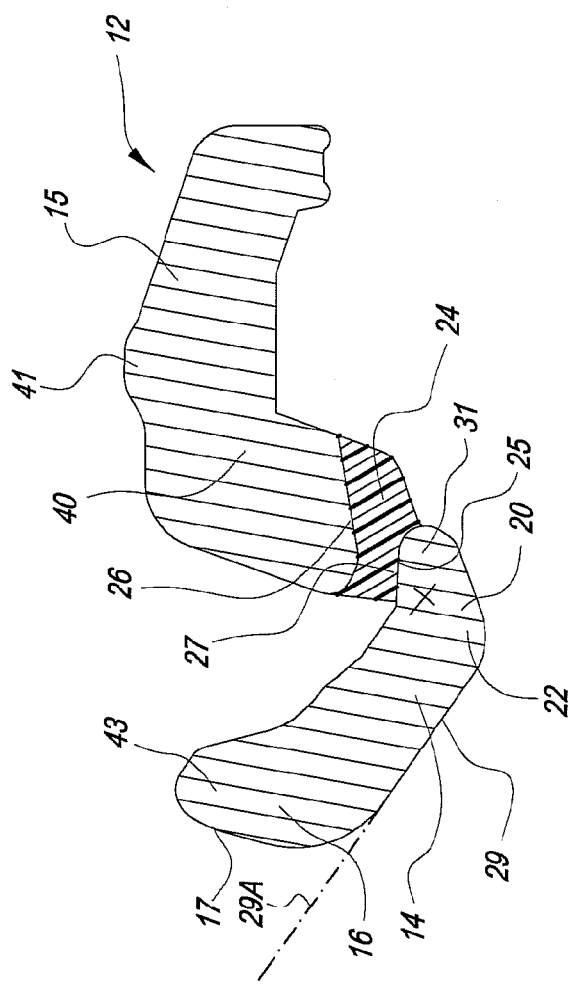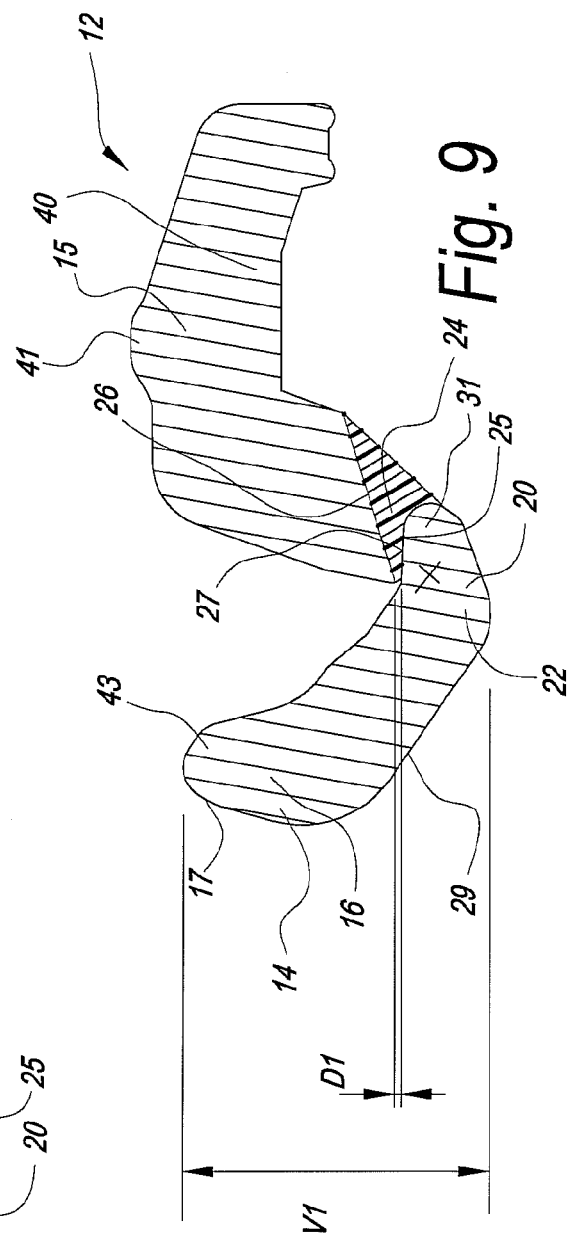

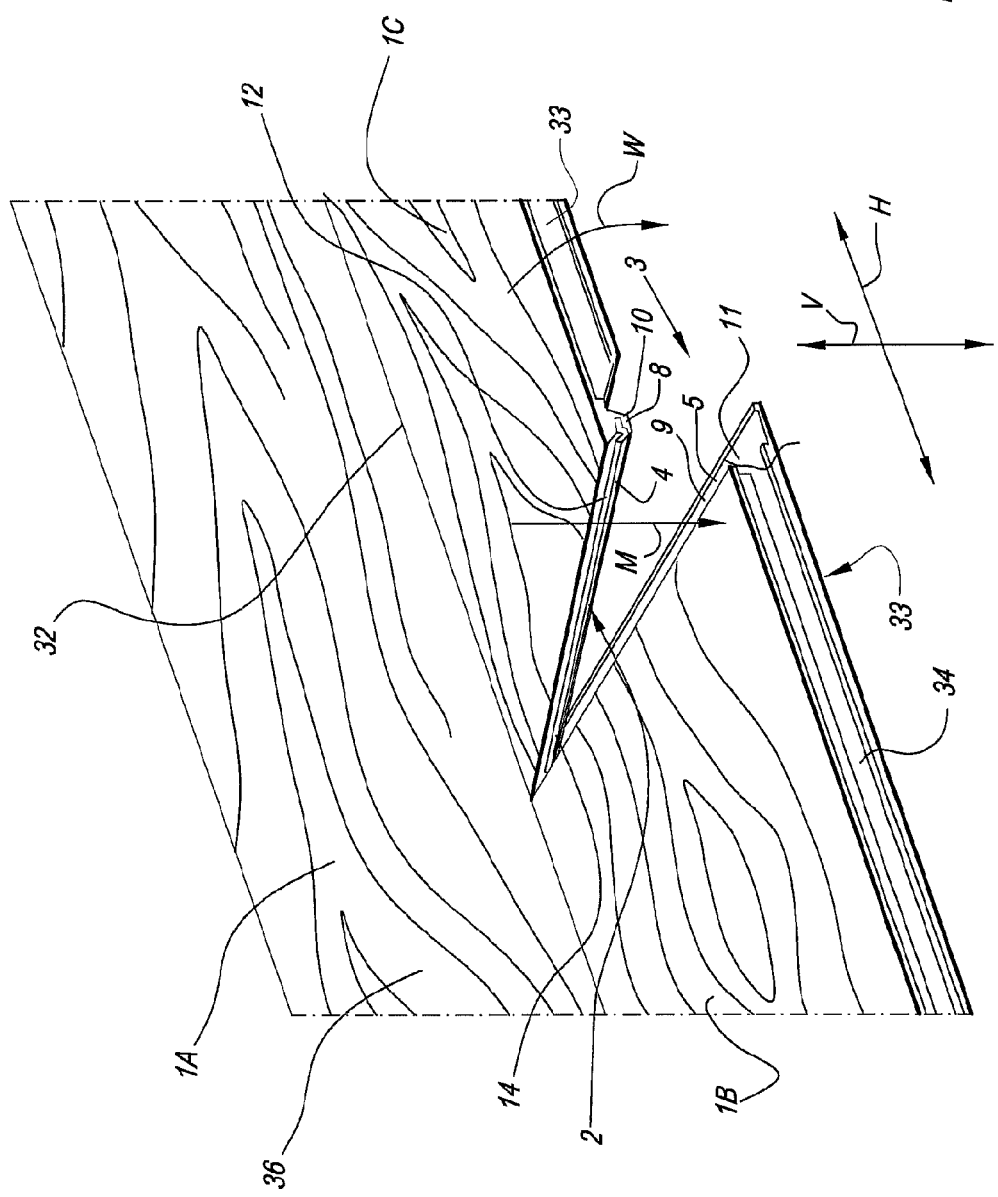

PANEL

BACKGROUND

1. Field of the Invention

This invention relates to a panel, such as, for example, to a floor panel, a ceiling panel, a wall panel or the like.

More particularly, it relates to a panel, which, at least at two opposite sides, comprises coupling parts, in the form of a male coupling part and a female coupling part, respectively, which allow that two of such panels can be connected to each other at said sides, or, in other words, can be brought in a coupled condition, by providing one of these panels with the pertaining male coupling part, by means of a downward movement, in the female coupling part of the other floor panel, such that thereby at least a locking in horizontal direction is obtained.

2. Related Art

Couplings allowing that two panels, such as floor panels, can be coupled to each other by inserting one floor panel with a downward movement into the other, in practice are divided into two types, namely a first type, wherein the coupling parts provide exclusively for a horizontal locking, without any locking in vertical direction, and a second type, wherein a horizontal as well as vertical locking is provided.

The couplings of the first type are also known as so-called "drop-in" systems. Floor panels which are provided therewith at two opposite sides are known, amongst others, from CA 991 373 and JP 07-300 979. As becomes evident from these patent documents, such "drop-in" systems often are applied on a first pair of opposite sides of the floor panels only, whereas then on the second pair of opposite sides coupling parts are applied, which, in the coupled condition of two floor panels, provide for a vertical as well as for a horizontal locking and which allow that two of such floor panels can be coupled to each other by means of an angling movement. Floor panels with such a combination of coupling parts offer the advantage that they can be easily installed in rows in a successive manner, simply by coupling each newly to install floor panel to the preceding row of floor panels by means of the angling movement and by providing for, during the angling down, that such floor panel at the same time also engages in an already installed preceding floor panel of the same row. Thus, installing such floor panel requires only an angling and putting down-movement, which is a particularly user-friendly installation technique.

A disadvantage of floor panels with such coupling parts consists in that, due to the fact that there is no locking in vertical direction, height differences among the coupled floor panels may occur on the upper surface. For example, such floor panels in a first or last row of a floor covering can turn upward again from their flat position if they are not held downward by a skirting board or the like. Even if such floor panels are provided with a "drop-in" system on only one pair of sides, whereas they are locked at their other pair of sides in horizontal as well as in vertical direction in respect to adjoining floor panels, height differences among adjoining floor panels can occur at the sides which are coupled by the "drop-in" system, amongst others, when two adjoining floor panels are loaded differently, or when one floor panel should warp somewhat and bend in respect to the other.

Couplings of the aforementioned second type, also called "push-lock" systems, attempt to remedy the aforementioned disadvantage by also providing a vertical locking. Such so-called "push-lock" systems can be divided into two different categories, namely one-piece embodiments and embodiments comprising a separate locking element which is made as an insert, which either is or is not fixedly attached to the actual floor panel.

One-piece embodiments are known, amongst others, from the patent documents DE 299 24 454, DE 200 08 708, DE 201 12 474, DE 10 2004 001 363, DE 10 2004 055 951, EP 1 282 752 and EP 1 350 904. The known one-piece embodiments have the disadvantage that they work relatively difficult and that a good interconnection of two floor panels cannot always be guaranteed.

Embodiments comprising a separate locking element, which assists in a vertical and possibly also horizontal locking between two coupled floor panels, are known, amongst others, from the patent documents DE 20 2007 000 310, DE 10 2004 001 363, DE 10 2005 002 297, EP 1 159 497, EP 1 415 056 B1, EP 1 818 478, WO 2004/079130, WO 2005/054599, WO 2006/043893, WO 2006/104436, WO 2007/008139, WO 2007/079845, WO 2009/066153, WO 2010/082171 and SE 515324. The use of a separate locking element offers the advantage that the material thereof is independent from the actual floor panel and thus can be chosen optimally in function of the application. In this manner, such inserts can be realized from synthetic material or metal, by which relatively strong, however, still easily movable locking portions can be realized, which can take up relatively large forces with a minimum contact surface.

SUMMARY

The present invention relates to panels or floor panels which are equipped with a "push-lock" system of the latter category, in other words, which comprise a, whether or not fixedly attached, however, separately realized insert. The aim of the invention consists in a further optimization of these "push-lock" systems in floor panels.

The invention relates to panels, and in particular to floor panels, which are of the specific type:
which, at least at two opposite sides, comprises coupling parts by which two of such panels or floor panels can be coupled to each other;
wherein these coupling parts form a horizontally active locking system and a vertically active locking system;
wherein the horizontally active locking system comprises a male part and a female part, which allow that two of such floor panels can be coupled to each other at the aforementioned sides by providing one of these floor panels with the pertaining male part, by means of a downward movement, in the female part of the other floor panel;
wherein the vertically active locking system comprises a locking element, which, in the form of an insert, is provided in one of the respective sides;
wherein this locking element comprises at least a lock-up body, preferably a pivotable lock-up body; and
wherein the lock-up body, at one extremity, forms a stop-forming locking portion, which can cooperate with a locking portion of a similar coupled floor panel.

Floor panels of this type are known, amongst others, from the FIGS. 5-7, 8 and 9-11 of the aforementioned EP 1 415 056 B1. In these known embodiments, the locking portion, made in the form of an insert, consists of a synthetic material strip with an elastically bendable lip, which, when being bent, functions as a pivotable lock-up body. These known embodiments show the advantage that with a relatively simple construction a so-called "push-lock" connection can be realized which is active over the entire length of the synthetic material strip. However, practice has shown that this known embodiment is not always smoothly operable and that tolerances in a realized coupling sometimes are difficult to keep under control.

Floor panels of this type are also known from WO 2010/082171 and WO 2009/066153, wherein the pivotable lock-up body, in these cases, opposite to the extremity forming the locking portion, comprises a support portion which can be rotated against a support surface pertaining to the respective panel, and more particularly in a seat. As the lock-up body is provided with a support portion which can be rotated against a support surface, and more particularly can be rotated in a seat, the pivoting movement of the lock-up body is better defined than in the embodiments of said EP 1 415 056 B1. In the embodiments of EP 1 415 056 B1, the pivotable lock-up body namely is made as a prolongation of an attachment portion, by which the hinge effect takes place in the material of the insert and the precise pivoting movement is difficult to predict, which may lead to less adequate working. The coupling parts disclosed in WO 2010/082171 and WO 2009/066153 entail difficulties when having to be integrated in specific panels. For example, it is difficult to apply the coupling parts in panels with limited thickness, for example, in panels having a thickness of 12 millimeters or less, and/or in laminate panels. Also, difficulties are experienced when it is desired to restrict the dimensions of the lock-up body, either as a result of lack of space in thin panels or as a result of striving for a more economical insert.

From said WO 2009/066153 and WO 2010/082171, meanwhile locking elements are known which, apart from a lock-up body, also comprise an attachment portion, for example, in the form of a clamped part, wherein this attachment portion retains the strip in the recess, and further also comprise a bending zone of a material different from the material of the lock-up body, wherein the respective bending zone shows a first boundary surface with said lock-up body as well as a second boundary surface with said attachment portion. Although the locking elements disclosed there offer a compromise between vertical locking strength, by means of the rigid lock-up body, and a supple coupling movement, by means of the bending zone provided especially for this purpose, such strip can create problems during the actual coupling. The strips known from the aforementioned documents show the disadvantage that the lock-up body, when coupling in vertical direction, can be pushed out of its desired position.

Primarily, the present invention aims at alternative panels of the aforementioned specific type, which, according to various preferred embodiments thereof, are improved further in respect to the aforementioned known embodiments, wherein those improvements, for example, allow integrating a push-lock system of the above-mentioned type into panels with a lesser thickness and/or to obtain a smoother coupling of two of such panels.

To this aim, the invention relates to a panel, which, at least at two opposite sides, comprises coupling parts with which two of such panels can be brought in a coupled condition; wherein these coupling parts form a horizontally active locking system and a vertically active locking system; wherein the horizontally active locking system comprises a male part and a female part, which allow that two of such panels, at said sides, can be connected to each other by providing one of these panels with the pertaining male part, by means of a downward movement, in the female part of the other panel; wherein the vertically active locking system comprises a locking element which, in the form of an insert, is provided in one of the respective sides; wherein this locking element comprises at least a lock-up body; and wherein the lock-up body, at one extremity, forms a stop-forming locking portion, which can cooperate with a locking portion of a similar coupled panel, wherein the locking element consists of a strip which is attached in a recess in the panel and that the locking element comprises an attachment portion which retains the strip in the recess, with the characteristic that the locking element comprises a bending zone of a material different from the material of the lock-up body, wherein this bending zone comprises a first boundary surface with said lock-up body as well as a second boundary surface with said attachment portion, wherein said lock-up body and the attachment portion, in the non-coupled condition, extend in horizontal direction at least for a part vertically underneath each other, wherein points of the first as well as the second boundary surface are situated on a vertical line one above the other and wherein said first boundary surface, in said non-coupled condition of the panels, globally seen extends in a direction enclosing an angle of less than 45° with the upper surface of the panels.

Within the scope of the present invention, the non-coupled condition means a condition in which the insert is provided in the recess, however, wherein the respective panel, at the side with the insert, is not coupled to another such panel and is not in any stage of a started coupling movement.

Thus, according to the first aspect, in the non-coupled condition, it is achieved that portions of the lock-up body and the attachment portion engage under each other or hook under each other. By the position of the respective boundary surfaces, namely a position in which they comprise at least points on a vertical line one above the other, the risk of the occurrence of shifting off in the bending zone is limited. Preferably, the respective boundary surfaces extend underneath each other at least for a third and still better for half of the smallest boundary surface. A further limitation of such shifting off is achieved in that the first boundary surface, globally seen, encloses a limited angle with the horizontal. Preferably, this angle is smaller than 30° or even smaller than 20°. The conjunction of these measures results in a limitation of the extent to which the lock-up body, during the downward coupling movement, can be pushed out of its desired position.

As said measures, or, in other words, the characteristics of the first aspect, are at least present in the non-coupled condition, the invention promotes the smoothness of the coupling at least at the start of the downward coupling movement.

The conjunction of said measures, namely that said lock-up body and the attachment portion extend in horizontal direction at least for a part vertically underneath each other, wherein points of the first as well as the second boundary surface are situated on a vertical line one above the other and wherein the first boundary surface, globally seen, extends in a direction which encloses an angle of less than 45° or better less than 30° or less than 20° with the horizontal, preferably is also present in a condition in which said lock-up body is situated completely underneath the upper side of that panel in which it is attached, and/or in the coupled condition of two of such panels. It is evident that such preferred embodiments further promote the smoothness of the coupling movement. It is clear that the condition in which said lock-up body is situated completely underneath the upper side of that panel in which it is attached, herein relates to an extreme condition which can be achieved during the coupling movement, or at least a close condition. Also in one or more of these conditions, it is preferred that the respective boundary surfaces, at least for a third and still better for half or more of the smallest boundary surface, extend in horizontal direction vertically underneath each other.

Preferably, the lock-up body relates to a pivotable lock-up body.

Preferably, said bending zone relates to an elastic bending zone which forms a connection, preferably the only connection, between the attachment portion and the lock-up body. Also in the case that said bending zone is less elastic or not elastic, it preferably forms the only connection between the attachment portion and the lock-up body.

Preferably, the respective parts of said lock-up body and said attachment portion extend underneath each other in such a manner that they herein, in at least one of said conditions, preferably at least in the non-coupled condition, maintain a vertical distance between each other.

Preferably, the lock-up body, in the non-coupled condition, has a relatively flat orientation, namely preferably an orientation in which the center line of the lock-up body forms an angle of less than 60°, and better of less than 50°, with the horizontal of the panel surface. This relatively flat orientation is of particular interest for the design of compact locking systems. So, for example, it is possible with an orientation which deviates from the panel surface only to a limited extent, to apply a lock-up body which is relatively long compared to the thickness of the panel, for example, a lock-up body which has a length of at least a third of the thickness of the panel or the possible substrate thereof. The orientation of less than 60° or less than 50° results in a more gradual locking during the downward coupling movement.

Preferably, said locking element is provided as an insert in a recess in said male part. Herein, said lock-up body preferably is directed upward with its stop-forming locking portion. In such case, this lock-up body preferably, in the non-coupled condition, further comprises a surface which, when performing said downward movement, comes into contact with the upper edge of the other panel, wherein this surface, when said contact is made, in the contact line has a tangent line 29A which forms an angle of 20° to 45° with the upper surface of the panels. Such feature promotes a smooth coupling of two of such panels at the respective sides, also in the case when the upper edge at these sides, or at least that side with the female part, is made straight, namely without chamfers or other deepened edges.

Preferably, the lock-up body is free from portions which extend beyond said tangent line at said surface. Such portions can hamper the coupling. Preferably, the lock-up body, however, has a widened cross-section at the extremity with the locking portion, wherein this widening results in a protrusion at the side of the lock-up body opposite to the surface which comes into contact with the upper edge of the panel to be coupled thereto.

Preferably, the locking element, and more particularly the lock-up body, has a concave side directed towards the recess in which it is provided, whereas the surface at the side of the locking element directed away from the recess preferably is made convex. During the coupling movement, such concave side can cooperate with the attachment portion, which allows an additional stabilization of the locking element during the coupling movement.

It is noted that achieving a smooth coupling is particularly interesting with panels which comprise a decorative top layer comprising melamine or other thermo-hardening or other brittle transparent layers, such as layers on the basis of UV-hardened or electron beam-hardened lacquer. In such panels, having to tap on the panels, for example, with a hammer, for coupling them to each other best is avoided.

In the cases in which said locking element is provided as an insert in a recess in said male part, it is preferably the first boundary surface which is situated vertically underneath the second boundary surface, and/or a part of the lock-up body which extends in horizontal direction vertically underneath a part of the attachment portion.

Preferably, the lock-up body relates to a pivotable lock-up body, wherein said lock-up body, opposite to the extremity which forms the locking portion, comprises a support portion which is rotatable against a support surface pertaining to the respective panel, and, for example, more particularly in a seat. Preferably, said support portion is in the form of a whether or not free extremity of the lock-up body, which, at least in vertical direction, is positively supported by a support portion or support surface pertaining to the panel or floor panel. Preferably, such support surface extends in horizontal direction at least for a part vertically underneath said first boundary surface.

In the cases wherein the support portion is made as a free extremity, it is not subjected to influences of adjacent material parts in its support portion, which is advantageous for a smooth hinge movement of the lock-up body. By a free extremity, it is substantially meant that this simply is made as a protruding leg to which no further parts are appended.

In the cases in which the support portion is made different from a free extremity, it is possible to achieve a pressing-on effect by means of an adjacent material part, which can lead to a more stable coupling.

Preferably, the lock-up body is rotatable around a pivot point, for example, around said support point or around a point of the support surface.

Preferably, said bending zone, in coupled condition, exerts a lateral tensile force on the lock-up body, namely transverse to the center line thereof, wherein this tensile force strives to bring the lock-up body closer to its non-coupled condition. It is noted that the measure wherein the first boundary surface, namely the boundary surface between the bending zone and the lock-up body, in the coupled condition extends in a direction which, globally seen, encloses an angle of less than 45° with the upper surface of the panels, can provide for an excellent moment effect of the elastic tensile forces in respect to the hinge point of a pivotable lock-up body, such that a constant tensioning effect of the locking portion of the lock-up body against the locking portion of the panel cooperating therewith can be obtained.

Preferably, the panel of the invention has a thickness of 15 millimeters or less, 12 millimeters or less, or still better a thickness of 9.5 or 8 millimeters or less. Preferably, the thickness, however, is more than 6 millimeters. Of course, it is not excluded that the invention should be applied with thicker panels, such as with panels having a thickness of 12 millimeters to 18 millimeters. Preferably, in such case so-called engineered wood panels or panels for prefabricated parquet are concerned.

Preferably, the length of the lock-up body, this is the shortest distance between the locking portion and the support portion, if such support portion is present, is more than 30 percent of the thickness of the panel, or still better more than 35 percent of the thickness of the panel.

Preferably, the panel of the invention relates to a panel which substantially is composed of a core material and a decorative top layer. Possibly, a backing layer can be applied on the side of the core material opposite to the top layer. According to the most preferred embodiment, for the core material a wood-based board material, such as MDF or HDF (Medium Density Fiberboard or High Density Fiberboard) is applied. Preferably, the decorative top layer substantially consists of synthetic material and/or paper, wherein the deco rative top layer preferably comprises a printed motif. Such panels can be composed according to various possibilities. Below, some possibilities will be described in more detail.

According to a first possibility, the panel relates to a laminate panel of the type DPL or HPL (Direct Pressure Laminate or High Pressure Laminate), wherein for the decorative top layer use is made at least of a printed or colored paper layer on which a transparent layer of melamine resin is situated. Possibly, this melamine resin as such can also include a transparent paper layer and/or hard particles. According to this first possibility, preferably a core material is used which consists of HDF or MDF, and on the underside of the core material preferably a backing layer comprising a paper layer and melamine resin is applied. Such backing layer offers a balancing effect for possible residual tensions which can be present in the top layer. According to the DPL principle, the composing layers and the core material of such panel are solidified and adhered to each other in one pressing step. According to the HPL principle, the composing layers of the top layer of such panel are solidified prior to being adhered to the core material in a subsequent step.

According to a second possibility, the panel relates to a directly printed laminate panel, wherein the decorative top layer is formed at least by performing a print on the core material, whether or not by the intermediary of one or more primer layers, for example, by means of offset printing or a digital printing process, such as inkjet printing. In order to obtain a certain wear resistance, such print can be finished further with one or more transparent lacquer layers or melamine layers, such as with one or more UV-hardened or electron beam-hardened lacquer layers. Such transparent layers further may also comprise hard particles. According to this second possibility, preferably a core material is used which consists of HDF or MDF, and at the underside of the core material preferably a backing layer is applied, which preferably provides for a vapor-tight barrier, for example, by means of a lacquer. According to this second possibility, a panel can be offered which is free from paper layers in the top layer and possibly in the backing layer, too.

Preferably, the decorative top layer is realized with a thickness which is smaller than 1 millimeter or even smaller than 0.5 or 0.3 millimeters. This is usually the case with the panels of the above first and second possibility. It is in particular with such panels that the invention shows its advantages. Namely, by means of the particular locking element of the invention a better vertically active locking system can be obtained. More particularly, a coupled condition can be achieved in which there are no or almost no height differences between the adjacent upper edges of the coupled panels. In any case, a possible height difference preferably is restricted to a maximum of 0.2 millimeters or even of 0.1 millimeter or less, such that the core material remains hidden. Minimizing height differences is particularly interesting with such thin top layers, as they, during use, can wear down relatively fast as a result of repeated impact on excessively protruding upper edges. In particular with decorative top layers which comprise melamine or other thermo-hardening or other brittle transparent layers, such as with layers on the basis of UV-hardened or electron beam-hardened lacquer, avoiding excessive height differences is relevant.

It is noted that at the coupled edges or sides possibly a chamfer or other bevel can be provided according to any technique.

Preferably, said whether or not pivotable lock-up body, in coupled condition, adopts an orientation in which the center line of this lock-up body forms an angle with the panel surface which is larger than the angle formed in the non-coupled condition. Preferably, the difference between both angles is at least 5° or even more than 10°. In this manner, a tensioning effect is obtained between the locking portion of the lock-up body and the locking portion of the coupled-thereto panel with which the lock-up body works in conjunction.

Preferably, said whether or not pivotable lock-up body, in coupled condition, adopts an orientation in which the center line of this lock-up body forms an angle with the panel surface of less than 90°, however, more than 50°.

Preferably, the lock-up body, for example, between the locking portion and the possible support portion, as such is free from hinge portions and bending sections. As the lock-up body is free from hinge portions and bending sections, possible influences thereof on the shape and length of the lock-up body are excluded, and a fixed usable length of the lock-up body can be guaranteed, such that, amongst others, small production tolerances can be maintained, which allow precise couplings without height differences or almost without height differences. In connection therewith, it is also preferred that the lock-up body is realized as a rigid element. Preferably, the lock-up body substantially consists of hard PVC or another hard synthetic material. In the case of PVC, preferably so-called stabilized PVC is used, or still better PVC comprising Ca/Zn stabilisators. Such stabilized synthetic material offers a stable lock-up body, even in extreme climatic circumstances.

Preferably, an elastic synthetic material, such as polyurethane, is applied for said bending zone.

As aforementioned, the locking element according to the invention comprises a bending zone. Preferably, such bending zone shows one or more of the following features:
  that it consists of an elastic material;
  that it consists of an elastic material which, as such, is more flexible than the material of the lock-up body, which preferably is realized, by means of coextrusion, in one piece with the lock-up body;
  that it consists of a foldable or bendable portion.

Preferably, the vertically active locking system comprises a tensioning system which is formed by a cam surface formed on the extremity of the locking portion of the lock-up body, which cam surface, in coupled condition, provides for a wedge effect against the opposite locking portion of the coupled floor panel. By such configuration, the lock-up body, in coupled condition, will always settle well under or on the locking portion of the other floor panel. By small movements which occur when the panels or floor panels are being walked on, the lock-up body, due to the wedge effect, will creep further under or onto the locking portion of the other floor panel, which will result in an even firmer coupling.

According to the invention, the locking element consists of a strip which is attached in a recess in the panel. To this aim, the locking element comprises an attachment portion. Preferably, the attachment portion is realized in the form of a clamped part. Preferably, said lock-up body, in the coupled condition of two of such panels, extends over a vertical distance which is smaller than 1.4 times, or still better is smaller than 1.3 times, the vertical distance defined by said attachment portion or said recess. Preferably, the vertical distance defined by said attachment portion or said recess is smaller than half of the thickness of the respective panel, or smaller than half of the thickness of the possible core material thereof, or even, still better, smaller than one third of the thickness. In the case of an attachment portion in the form of a clamped part of the strip, said vertical distance is determined by the largest vertical distance between the clamping surfaces on the opposite sides of the strip.

Preferably, the locking element is provided in a recess and, in the non-coupled condition, it is located with its locking portion completely outside of said recess.

Preferably, the locking element consists of a coextruded synthetic material strip provided in a recess, which strip, seen in cross-section, is composed of two or more zones consisting of synthetic materials with different features, wherein at least one of these synthetic materials relates to stabilized PVC (Polyvinyl chloride).

The use of such coextruded synthetic material strip offers the advantage that the features can be chosen depending on the function which certain components of such strip have to exert. Stabilized polyvinyl chloride is ideally suitable for forming a rigid portion of the locking element, such as, for example, said lock-up body and/or the locking portion, whereas said bending zone can consist of synthetic material with another feature, preferably of a more supple synthetic material.

According to a preferred embodiment, parts of said pivotable lock-up body and the attachment portion, in the non-coupled condition, extend at least for a part in horizontal direction underneath each other, while herein maintaining a vertical distance between each other. It is noted that herein, said vertical distance does not have to be constant and preferably even varies in said horizontal direction. Herein, the vertical distance preferably increases from the lock-up body towards the attachment portion.

Preferably, said whether or not pivotable lock-up body and the attachment portion, during the major part of the downward coupling movement or during the entire coupling movement, at least for a part extend in horizontal direction underneath each other while maintaining a vertical distance between the respective parts. During the coupling movement, vertical forces exerted on the lock-up body can be absorbed better, which can be advantageous for the stability of the coupling.

Preferably, the extent to which said pivotable lock-up body and the attachment portion extend underneath each other is larger in coupled condition than in non-coupled condition.

Preferably, the smallest vertical distance between the respective portions of the lock-up body and the attachment portion, which extend underneath each other, is less than 0.4 millimeters or even less than 0.2 millimeters.

As aforementioned, bending zones in practice can be realized in that the locking element consists of a coextruded synthetic material strip with, seen in cross-section, a plurality of zones of synthetic material with different characteristics, namely, on the one hand, at least a first zone formed by said lock-up body and, on the other hand, at least a second zone formed by said preferably elastic bending zone. Said attachment portion preferably forms a third zone, which preferably consists of a similar synthetic material as said first zone of the lock-up body.

Preferably, the material of the preferably elastic bending zone is free from contact with the remaining material of the panel and thus preferably only engages at surfaces of the lock-up body and the attachment portion, namely said first and second boundary surface, respectively.

As aforementioned, the locking element, according to an important embodiment, is provided in said male part, wherein said whether or not pivotable lock-up body is directed upward. Again, it is emphasized that with such embodiment, a smooth coupling movement is particularly critical. In fact, when performing the downward movement, the lock-up body is pressed inward by means of a contact with the upper edge of the other panel. Such upper edge forms a far from ideal guide surface for the lock-up body, certainly in the cases where a straight upper edge is used, but also in the cases where a chamfer or other deepened edge is provided at this upper edge. This contact with the upper edge of the other panel can result in that the locking element is pressed upward, and the locking element can be pulled out of its position in such a manner that the coupling becomes impossible. As now, according to the invention, said pivotable lock-up body and the attachment portion extend at least for a part in horizontal direction underneath each other, however, preferably maintain a vertical distance between each other herein, it is obtained that the lock-up body is better supported by means of the attachment portion.

According to the above important embodiment, it is namely preferably said pivotable lock-up body which, in the coupled condition, extends at least for a part in horizontal direction underneath the attachment portion. In this manner, it is obtained that the pushing-upward of the lock-up body can be counteracted by the attachment portion.

Various advantageous subordinate characteristics of the invention will be described further by means of the embodiments represented in the figures. All these subordinate characteristics do not necessarily have to be applied in the mutual combinations as are shown in the figures. Each characteristic can be combined as such with the basic aspects of the invention.

It is noted that the present invention preferably is applied in embodiments wherein the locking element, which is made as an insert, serves substantially, and still better exclusively, as a locking element assisting in the vertical locking and thus not in the horizontal locking. The horizontal locking preferably is performed exclusively by parts, such as the aforementioned male part and female part, which are realized from the actual panel material or substrate material, more particularly are formed therefrom by machining. More particularly, the invention preferably relates to embodiments wherein the insert is produced separately and then is mounted in an edge of an actual floor panel, whether or not in a fixed manner.

Further, it is noted that the locking systems of the invention are of particular interest for being applied in panels having a usable panel surface of more than 0.4 or more than 0.45 square meters. According to a particular possibility, this relates to panels having a usable panel surface of approximately half a square meter. Herein, this may relate to oblong panels with a length of more than 2 meters and a width of approximately 20 centimeters or more, or to oblong panels with a width of 40 centimeters or more and a length of 1 meter or more, or to square panels with a side of 60 centimeters or more. By means of the locking systems of the invention, a particularly handy installation can be obtained for these large panels which are more difficult to handle.

It is clear that there, where in the above text a center line of the lock-up body is mentioned, one of the main directions or own directions (English: Eigendirection) of this lock-up body is meant.

Further, it is clear that the direction of the first boundary surface, globally seen, can be determined by means of the smallest quadrant line or another mean line through this boundary surface.

BRIEF DESCRIPTION OF THE DRAWINGS

With the intention of better showing the characteristics of the invention, hereafter, as an example without any limitative character, some preferred embodiments are described, with reference to the accompanying figures, wherein:

FIG. 1 schematically and in top view represents a floor panel according to the invention;

FIG. 2, at a larger scale, represents a cross-section according to line II-II in FIG. 1;

FIGS. 4 to 6, in a view onto the area indicated by F4 in FIG. 3, represent the respective floor panels in different stages of the coupling movement;

FIG. 7, at a larger scale, represents the insert of the floor panels from FIGS. 1 to 6;

FIG. 8 in perspective represents how the floor panels of FIGS. 1 to 6 can be coupled to each other;

FIG. 9, in a view similar to that of FIG. 7, represents a variant of such insert, which can be applied as a locking element in the panels of the invention;

DETAILED DESCRIPTION OF VARIOUS EMBODIMENTS

As represented in FIGS. 1 to 6, the invention relates to a floor panel 1, which, at least at two opposite sides 2-3, comprises coupling parts 4-5 with which two of such floor panels 1 can be coupled to each other.

Figure 3:
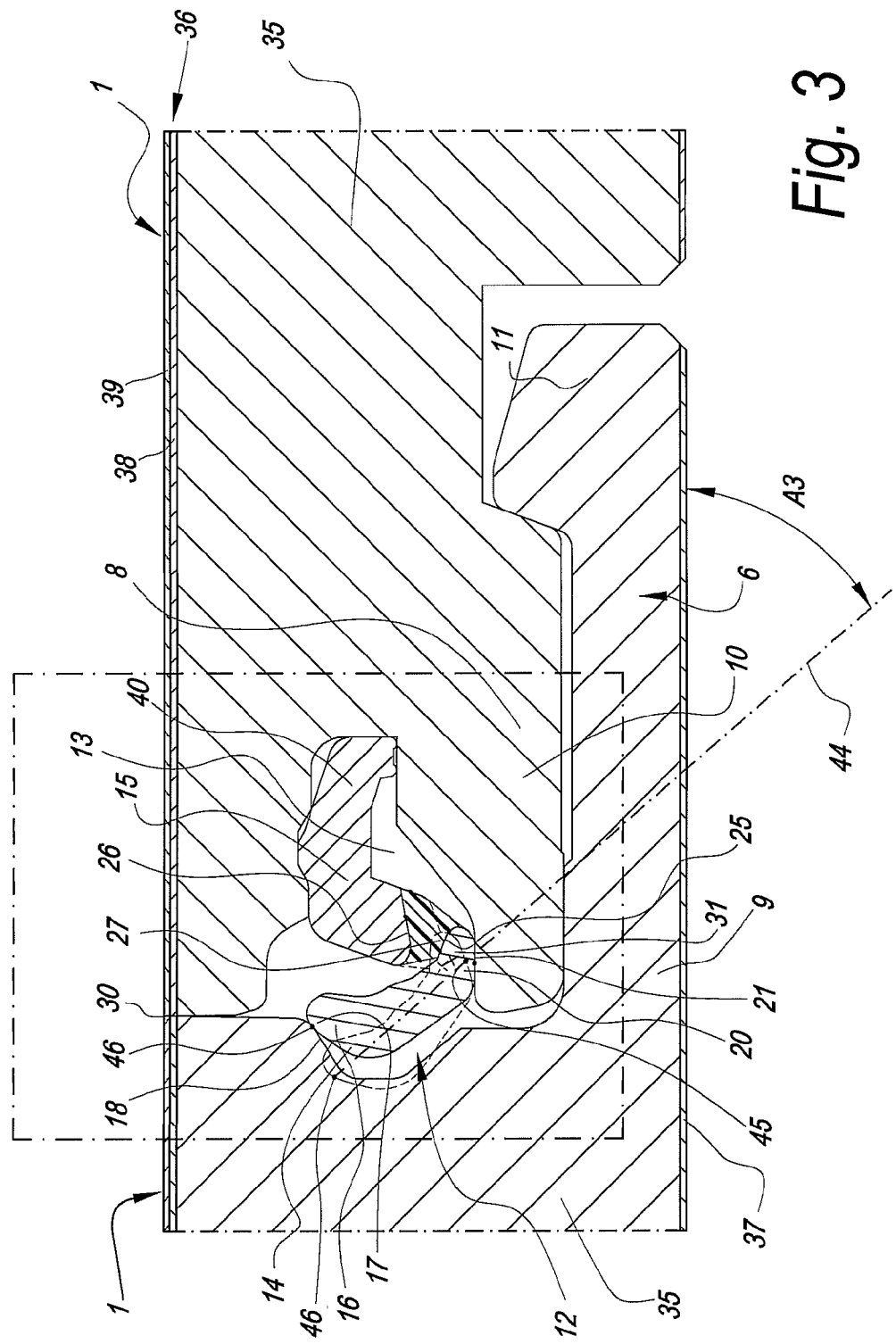
FIG. 3 in cross-section represents two floor panels, which are made according to FIG. 2, in coupled condition.

As becomes clear from the coupled condition of FIG. 3, these coupling parts 4-5 comprise a horizontally active locking system 6 and a vertically active locking system 7. The horizontally active locking system 6 comprises a male part 8 and a female part 9, which allow that two of such floor panels 1 can be connected to each other at said sides 2-3 by providing one of these floor panels 1 with the pertaining male part 8, by means of a downward movement M, in the female part 9 of the other floor panel, which movement M is illustrated by means of the two different positions in FIGS. 4 and 5 and wherein FIG. 6 again represents the final locked position.

The male part 8 is formed by a downward-directed extremity of a hook-shaped part 10, whereas the female part 9 consists of a seat formed by means of an upward-directed hook-shaped part 11.

The vertically active locking system 7 comprises a locking element 12, which, in the form of an insert, is provided in one of the respective sides, in this case the side 2, more particularly in a recess 13 provided for this purpose. For clarity's sake, the locking element 12, or, in other words, thus, the insert, is depicted in separate condition in FIG. 7. As can be seen in this figure, this locking element 12 preferably is made as a strip. It is clear that this strip preferably extends over the entire or approximately entire length of the side 2, for example, at least 75 or even at least 85 percent thereof. According to another possibility, a plurality of separate strips can bridge over the entire or approximately the entire length of the side 2. Preferably, a strip is present at least centrally on the length of this side 2, irrespective of the length over which this strip extends.

Preferably, this strip consists of synthetic material, however, it is not excluded to use other materials for this purpose. Further, it is preferred that the strip has a continuous cross-section over its entire length, resulting in that it can be manufactured and/or mounted in a simple manner. Such strip can be produced, for example, by an extrusion technique and can be shortened to the desired length. Thus, the same continuous strip can be used for panels of different dimensions, for example, can each time be shortened to the dimension of the respective side on which the strip has to be provided. In the case of a synthetic material strip, preferably use is made of PVC, such as, for example, stabilized hard PVC.

In the represented example, the locking element 12 is at least composed of a pivotable lock-up body 14 and an attachment portion 15. In the embodiment of FIGS. 2 to 6, the lock-up body 14 consists of the entire upright part, whereas the attachment portion 15 is formed by a rather horizontally directed part. Preferably, the attachment portion 15, as in all examples, however has a convex upper side and a concave bottom side. In this manner, the attachment portion can have an approximately constant wall thickness, which corresponds to the wall thickness of the lock-up body 14, however, which is smaller than the global height of the recess 13 in which the locking element 12 or the strip is provided. The obtained bridge shape of the attachment portion 15 allows that the locking element 12 can be applied in a larger recess 13 in a stable and repeatable manner. A larger recess 13 is simpler to realize by means of milling tools. The bridge shape of the attachment portion 15 allows a certain deformation in respect to the application thereof in the recess 13, the height of which moreover does not necessarily have to be performed in a precise manner.

Figure 5:
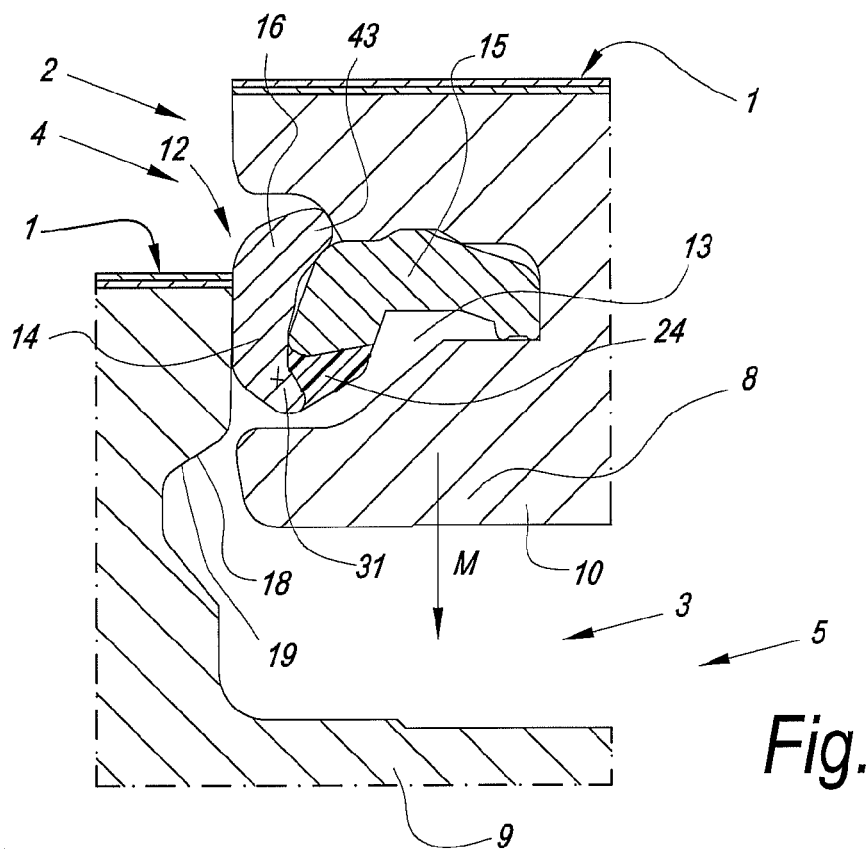
Figure 6:
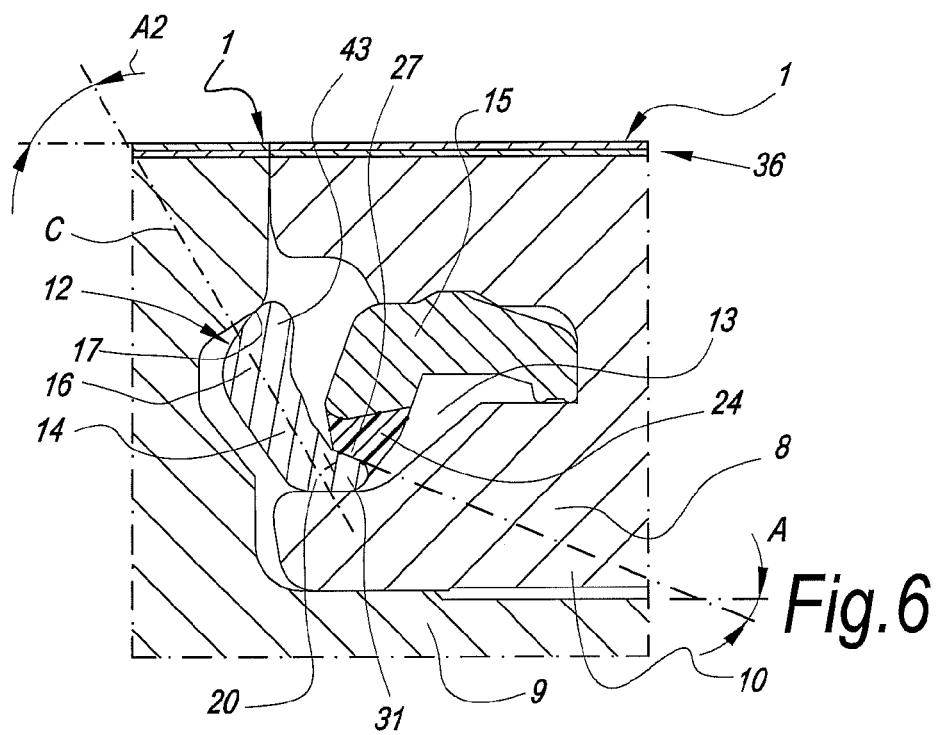

The extremity 16, which can be rotated out, of the lock-up body 14 functions as a stop-forming locking portion 17, which can work in conjunction with a locking portion 18 of a similar coupled floor panel 1. Herein, the locking portion 18 preferably is formed by a portion which defines a stop-forming surface 19 which is present in the side 3 for this purpose and preferably is realized in the core of the floor panel 1 by machining. The working of the vertically active locking system is simple to deduce from the figures and is based on the principle that, as represented in FIGS. 4 and 5, when the respective floor panel is put down, the lock-up body 14 is folded-in elastically by the contact with the edge of the other floor panel, after which, once the floor panels have arrived in the same plane, the lock-up element or lock-up body 14 pivots back outward in order to become placed under the locking portion 18, such that the coupled condition of FIGS. 3 and 6 is created.

In the example, the pivotable lock-up body 14, opposite to the extremity 16 forming the locking portion 17, forms a support portion 20 which can be rotated against a support surface 21 pertaining to the respective floor panel 1. In the embodiment of FIGS. 2 to 6, by the support portion 20 thus the extremity 22 opposite to the locking portion 17 is meant, in this case the lowermost extremity, of the lock-up body 14.

Further, the lock-up body 14, in the example, between the locking portion 17 and the support portion 20, in other words, between its extremities 16 and 22, as such is free from hinge portions and bending sections. To this aim, the lock-up body 14 thus is made relatively thick and preferably forms a rigid body, by which is meant that the lock-up body 14 cannot undergo any noticeable deformations between its extremities when pressures that usually can occur with "push-lock" couplings are exerted thereon.

Further, in the represented embodiment the support portion 20 is realized as a free extremity, which at least in vertical direction is positively supported by a support portion 23, more particularly support surface 21, pertaining to the floor panel 1.

Generally, it can be stated that the locking element 12 preferably consists of a strip which is attached in a recess, in the represented example thus the recess 13, in the floor panel 1 and that herein attachment portions are present which retain the strip in the recess. More particularly, it is preferred that the strip, such as here, is locked in place in the recess and/or, according to a variant, is enclosed therein due to the design.

According to another variant, the attachment portion 15 can be glued to the panel 1 in the recess 13.

It is noted that other techniques for attaching or retaining such strip in the recess are possible, for example, by gluing, clamping or the like.

The embodiment illustrated by means of FIGS. 2 through 6, in accordance with the invention, further also illustrates the particular characteristics that the locking element 12 comprises a bending zone 24 of a material different from the material of the lock-up body 14, wherein this bending zone 24 comprises a first boundary surface 25 with said lock-up body 14 as well as a second boundary surface 26 with said attachment portion 15. In this case, this relates to an elastic bending zone 24.

As represented in FIG. 4, the lock-up body 14 and the attachment portion 15, in the non-coupled condition, extend in horizontal direction H underneath each other at least for a portion 27. Herein, points of the first boundary surface 25 as well as of the second boundary surface 26 are situated on a vertical line, for example on the line 28, one above the other. In the examples, the first boundary surface 25 and the second boundary surface 26 extend underneath each other, at least for a third and here even at least for half of or the entire smallest boundary surface, wherein the smallest boundary surface in this case is the first boundary surface 25.

FIG. 4 further clearly shows that, in the non-coupled condition, the first boundary surface 25, globally seen, extends in a direction which encloses an angle A of less than 45° with the upper surface of the panels 1. In the example, the angle A in the non-coupled condition is less than 10° and here even approximately 0°.

FIG. 4 further also represents that the lock-up body 14 in the non-coupled condition can take an orientation in which the center line C of the lock-up body forms an angle A1 of less than 60° with the horizontal or, in other words, with the upper surface of the panels 1 or the panel surface. In the example, this angle A1 is less than 50°, namely approximately 45°.

As also represented in FIG. 4, the lock-up body 14 here has a surface 29 which, when performing the coupling movement M, comes into contact with the upper edge 30 of the other panel. The respective surface 29, which in the example is situated at the downward-directed side of the lock-up body 14, in the here represented realization of the contact in the contact point has a tangent line 29A forming an angle A2 of 20° to 45° with the horizontal or the upper surface of the panels. In this case, this angle A2 is approximately 35°.

The features illustrated by means of FIG. 4, all separately or in combination, are of particular interest when the strip is applied in the male part 8 and/or when the panel 1 with which coupling has to be performed, has a straight upper edge 30, such as this is the case in the examples.

FIG. 6 clearly represents that the measures of the invention mentioned in the introduction in this case are also present in the coupled condition of two of such panels 1. Here, too, the lock-up body 14 extends at least for a part underneath the attachment portion 15; at least points, and preferably larger parts, of the first and second boundary surface 25-26 are situated on a vertical line one above the other, and the first boundary surface 25 extends in a direction which encloses an angle A with the upper surface of less than 45°.

FIG. 5 represents a condition in which said lock-up body 14 is situated completely underneath the upper side or the upper surface of the panel 1 in which it is attached. Here, too, the lock-up body 14 extends at least for a part 27 underneath the attachment portion 15, and at least points, and preferably larger parts of the first and second boundary surface 25-26 are situated on a vertical line one above the other. In the example and in this condition, the first boundary surface 25, however, extends in a direction which encloses an angle A with the upper surface of more than 45°.

In each of the conditions represented in the FIGS. 4 through 6, the lock-up body 14 and the attachment portion 15 extend underneath each other in such a manner that they herein, in the respective condition, maintain a vertical distance between each other.

It is clear that the locking element 12, in the examples, is provided as an insert in a recess 13 in the male part 8 and that the lock-up body 14 is directed upward with its locking portion 17. This relates to the most preferred embodiment of the invention. However, it is not excluded that the insert may be provided in the female part 9, wherein it then preferably would be directed downward with its locking portion 17.

FIGS. 3 and 6 further represent that said support surface 21, in the coupled condition of two of such panels 1, extends in horizontal direction preferably at least in part vertically underneath the first boundary surface 25. The same is valid for the support portion 20 of the lock-up body 14.

The FIGS. 2 through 7 illustrate another preferred characteristic of the invention, namely that the lock-up body 14 comprises a hook-shaped protrusion 31 at the underside thereof, or at the side which is directed away from the locking portion 15 thereof or at the extremity 22, and that the part with which the lock-up body 14 extends underneath the attachment portion 15 concerns at least a part of this hook-shaped protrusion 31.

The beneficial effect of the measures of the invention is illustrated clearly by means of the successive stages of the coupling movement M by means of FIGS. 4 through 6. FIG. 4 shows the condition at the start of the contact between lock-up body 14 and the other panel 1 which has to be coupled with the respective panel 1. At this moment, a force is created in vertical direction V, which, apart from a rotation of the lock-up body 14, can also result in pushing up the locking element 12. According to the invention, this pushing up is restricted by the presence of the measures of the invention. Indeed, the fact that the lock-up body 14 hooks at least for a part 27 underneath the attachment portion 15 and the geometry of the boundary surfaces 25-26 of the bending zone 24 result in this restriction. The measures restrict shifting off in the bending zone 24, and the bending zone 24 primarily is pressure-loaded when the lock-up body 14 or the locking element 12 should be pushed upward. FIG. 5 represents that it is not excluded that in the panels 1 of the invention during coupling a certain pushing upward of the locking element 12 would take place. The pushing up must be minimized primarily in the first contact with the panel 1 to be coupled, namely, in the condition of FIG. 4.

Figures 10, 11:
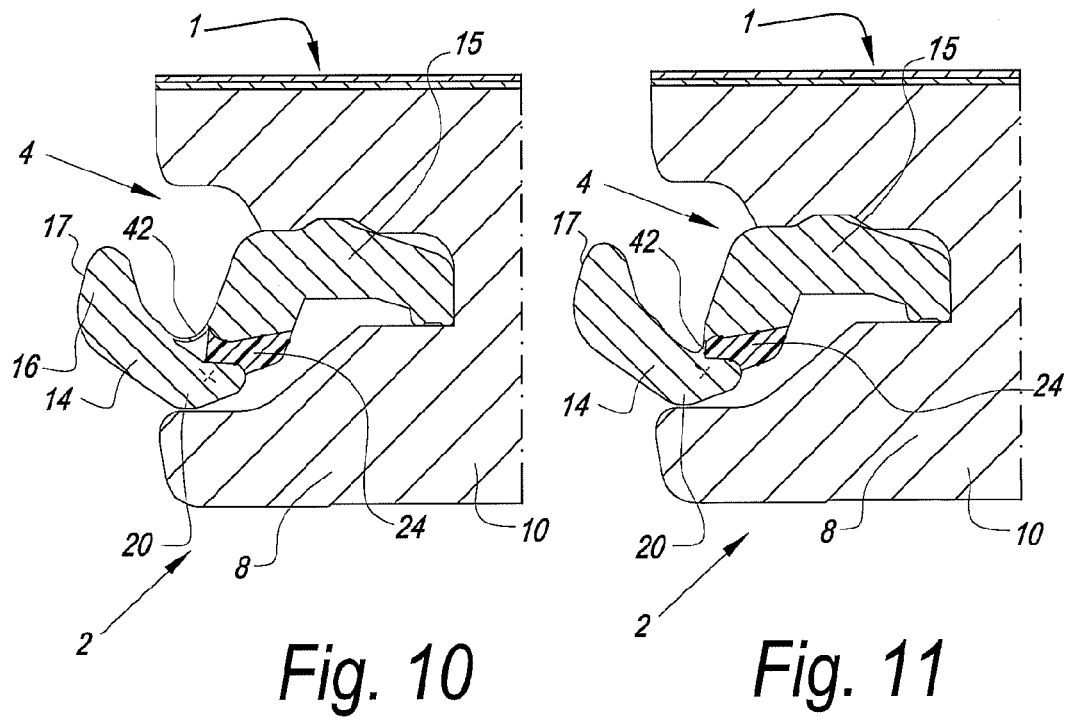
FIGS. 10 and 11, in a view similar to that of FIG. 4, represent some variants.

FIG. 7 further represents that the locking element 12 consists of a coextruded synthetic material strip, which, seen in cross-section, as according to the view of FIG. 11, is composed of two or more zones, in this case of three zones, which consist of synthetic materials with different characteristics, wherein at least one of these synthetic materials concerns stabilized PVC (PolyVinyl Chloride). In the example, a first zone is formed by the pivotable lock-up body 14, a second zone by the bending zone 24 and a third zone by the attachment portion 15. In this case, at least the lock-up body 14 or the first zone is realized in a harder and/or less flexible synthetic material, preferably in said stabilized PVC, than the bending zone 24 or the second zone. This second zone can be realized, for example, in polyurethane or a polyurethane-based synthetic material, such as in polyisocyanurate. Said third zone can be realized in the same synthetic material or in a similar synthetic material as said first zone.

Thus, the bending zone 24 preferably comprises an elastic material and more particularly a material which as such is suppler than the material of the lock-up body 14. Preferably, this is also synthetic material, and in the most preferred embodiment, the bending zone 24 is realized in one piece with the lock-up body 14 by means of coextrusion. In the figures, the coextruded materials are represented with a different hatching.

Generally, it is noted that a locking element 12 in cross-section may have only minor dimensions, as this has to be integrated into the edge of floor panels which in practice have a thickness which mostly is less than 2 cm and wherein the thickness in many cases is even less than 1 cm. The space which then is available for the locking element 12 thus often will be in the order of magnitude of only 5 millimeters or less. When, with such small dimensions, different supplenesses have to be built-in into the locking element 12, the possibilities thus will be limited if one wants to realize this in a traditional manner by working with different thicknesses. By using coextrusion, a larger range of possibilities is created for building-in different supplenesses and thus also a different elasticity, depending on the intended effect.

The coextruded materials can consist of the same or a similar basic material and, for example, may differ from each other only in that certain components have been added to the one material or certain components are present to a larger extent. In a practical embodiment, the entire strip consists of PVC, however, the more supple part is formed of PVC to which a larger amount of plasticizer has been added.

It is noted that, as represented in the figures, the locking portion 17 of the lock-up body 14 preferably is realized in the form of a widened end of the lock-up body 14, which offers more space for realizing the locking portion with a desired surface. Such surface preferably is designed such that, when using the panels or floor panels, the lock-up body 14 can pivot out to a larger extent and a vertical locking remains present and even an increasingly intense cooperation is created between the locking portion 17 and the locking portion 18 of the opposite panel 1. So, for example, a so-called cam surface can be used, such as described in WO 2009/066153.

As represented in the figures, the locking element 12 and the recess 13 are realized such that this locking element 12, in the free non-coupled condition of the respective floor panel 1, is located with its locking portion 17 entirely outside of the recess 13.

FIG. 6 further represents that the lock-up body 14 in coupled condition adopts an orientation in which the center line C of the lock-up body 14 encloses an angle A4 with the upper surface which is larger than the also above-defined angle A1. The difference is at least 5° and in this case even more than 10 or 15°. In this manner, a strong tensioning effect is obtained.

According to a preferred embodiment of the invention in general, the bending zone 24, in the coupled condition, such as in the examples, is tensile-loaded, wherein this tensile load forces the lock-up body 14 to return closer to its non-coupled condition in which it encloses a smaller angle with the upper surface. This tensile load can ensure the contact between the locking portion 17 of the lock-up body 14 against the locking portion 18 of the panel 1 coupled thereto. In such case, a continuous tension in the contact can be achieved.

The orientation of the first boundary surface 25 results in the coupled condition, such as in FIG. 6, in a performant moment effect on the lock-up body 14 as a result of also above-mentioned tensile forces.

Preferably, said angle A4, as in the example of FIG. 6, is smaller than 90° and preferably also smaller than or equal to 60°, or smaller than 50°.

In the case of rectangular floor panels 1, i.e. either oblong or square, it is clear that coupling parts 34 can also be provided at the second pair of opposite sides 32-33, which coupling parts, in coupled condition, preferably also provide for a locking in a vertical direction perpendicular to the plane of the coupled panels 1 as well as a locking in a horizontal direction in the plane of the coupled panels and perpendicular to the respective sides 32-33. These coupling parts 34 at the second pair of sides 32-33 can also be realized as a "push-lock" coupling, whether or not in accordance with the present invention. Preferably, however, at the second pair of sides 32-33 coupling parts 34 will be applied which allow a mutual coupling by means of an angling movement W between two floor panels 1 to be coupled and/or by means of a shifting movement which results in a snap connection. Such coupling parts are widely known from the state of the art and are described, for example, in WO 97/47834.

In the most preferred embodiment, at the second pair of sides 32-33 coupling parts 34 will be applied which allow at least a connection by means of an angling movement W, as this allows that the floor panels 1, as illustrated in FIG. 8, can be installed in a simpler manner. Then, a newly to install floor panel 1C can be angled at its side 33 in a simple manner into the previous row of floor panels 1A, and such just next to a preceding floor panel 1B in the same row. When being angled down, the male part 8 of the new floor panel 1C to be installed thus also automatically engages in the female part 9 of the preceding floor panel 1B, without the necessity of performing another operation. In the case of elongate floor panels 1, it is, thus, preferred that the so-called "push-lock" connection then is situated at the short sides 4-5.

It is clear that the coupling according to the invention can be applied in combination with any floor panel 1, such as in so-called prefabricated parquet, more particularly in so-called "engineered wood". In such case, this relates to floor panels which are composed of a core material 35 composed of strips, a top layer 36 of wood, as well as a backing layer of wood. The top layer 36 then consists of wood of a good quality, which functions as a visible decorative layer. The backing layer 37 can consist of a cheaper wood species. The strips preferably also consist of a cheaper, for example, soft wood species. However, it is preferred that on the ends of the floor panels 1 strips of a material are applied which is relatively stable and is suitable for providing therein the desired profile forms, for example, milling them therein. In a practical embodiment, these strips consist of MDF (Medium Density Fiberboard) or HDF (High Density Fiberboard). It is clear that the invention can also be applied in combination with other forms of "engineered wood", for example, when the core consists of a single continuous MDF/HDF board or of a plywood board.

The figures respectively represent the application in panels which substantially consist of a core material 35 and a decorative top layer 36. More particularly, in the examples a laminate floor panel 1 is concerned, in this case a so-called DPL (Direct Pressure Laminate), which, in a known manner, is composed of a core material 35, for example, of MDF or HDF, a top layer 36 on the basis of one or more layers impregnated with resin, for example, a printed decor layer 38 and a so-called overlay 39, as well as a backing layer 37, which also consists of one or more layers impregnated with resin, wherein the whole is consolidated under pressure and heat.

Of course, applications in other floor panels 1 are not excluded.

Generally, the invention shows its advantages best with floor panels 1 having a total thickness of less than 1 centimeter.

Generally, it is preferred that a locking element 12 according to the invention provides for a stable support in vertical direction V, whereas in horizontal direction H, thus, in pivoting direction, a supple movability is achieved. Applying coextruded parts assists therein.

By means of the invention, an improved snap-in effect is obtained in locking systems of the specific type mentioned in the introduction, in particular in the cases in which the lock-up body 14 is directed upward. In such cases, snapping-in can be awkward in the state of the art systems. As illustrated in FIG. 4, the upward-directed lock-up body 14, when coupling two of such panels 1 by means of a downward movement M, slides over a sharp edge, in this case over the upper edge 30 of the opposite panel. In the examples, the more flexible synthetic material of the bending zone provides for a suppler downward-directed coupling movement M, wherein the risk or the tendency that the panels 1 are pushed apart from each other in horizontal direction H and a less qualitative coupling will be created, is minimized. The invention is particularly interesting when applying laminate panels 1. In this manner, the risk of damage of the thin top layer 36 consisting of laminate when coupling the panels 1 is minimized.

According to the example from FIGS. 2 to 7, the lock-up body 14 and the attachment portion 15, more particularly the clamping part 40, extend in the non-coupled condition horizontally at least for a part underneath each other while still maintaining a mutual vertical distance. In the coupled or non-coupled condition of two of such panels 1, in this case both, said support surface 21, in horizontal direction H, extends at least for a part vertically underneath said whether or not elastic bending zone 24 and underneath said attachment portion 15 or more particularly the clamping portion 40.

FIG. 9 further represents that the smallest vertical distance D1 between the respective portions of the lock-up body 14 and the clamping portion 40, which extend underneath each other, is smaller than 0.4 millimeters or at least is smaller than 5 percent of the vertical height V1 of the lock-up body 14 in free condition. This is in the condition in which the locking element 14 is not located in the recess 13. Such small distance D1 provides for a further minimization of shifting off in the bending zone 24 at the start of the coupling movement M. The extent to which the lock-up body 14 can be pressed upwards is restricted even more than in the example of FIG. 8.

In the example of FIGS. 7 and 9, the locking element 12 comprises an elastic bending zone 24, which forms a connection between the attachment portion 15 and the pivotable lock-up body 14. This elastic bending zone 24 extends between the respective portions of the lock-up body 14 and the attachment portion 15, which extend underneath each other.

In the examples of FIGS. 7 and 9, said locking element 12 is provided in said male part 8, and said pivotable lock-up body 14 is directed upward. Herein, the pivotable lock-up body 14, in the coupled, however, also in the non-coupled condition, extends horizontally at least for a part underneath the attachment portion 15 or clamping portion 40.

FIGS. 7 and 9 further also represent that the lock-up body 14 has a surface 29 which, when performing said downward movement M, comes into contact with the upper edge 30 of the other panel 1, wherein this surface 29, when this contact is effected, shows a tangent line 29A in the contact point which forms an angle A1 of 20 to 45° with the upper surface of the panels 1. This measure promotes a smooth mounting of the panels 1.

The embodiment of FIGS. 7 and 9 is also particular in that the insert, more particularly the clamping portion 40, is provided with a locking part, in this case a protrusion 41, which allows to snap this clamping portion 40 into the core material 35 of the panel 1, more particularly into a recess 13 in the core material 36 provided for this purpose.

The inserts from FIGS. 7 and 9 preferably consist of a coextruded synthetic material strip and as such are a subject of the invention.

In the examples of FIGS. 7 and 9, the bending zone 24 forms a connection, in these cases even the only connection, between the lock-up body 14 and the attachment portion 15. FIGS. 10 and 11 represent that it is not excluded that, apart from a connection through the bending zone 24 consisting of another material than the lock-up body 14, it is not excluded to work with an additional connection 42, whether or not consisting of the same material as the lock-up body 14. In the case of FIG. 10, this relates to an additional connection 42 by means of a separate film hinge formed of the same material as the lock-up body 14. Here, by "separate" is meant that the material of the film hinge does make no or almost no contact with the material of the bending zone 24. In the case of FIG. 11, use is also made of an additional connection 42 by means of a film hinge formed of the same material as the lock-up body 14. Contrary to the embodiment of FIG. 10, in FIG. 11 a film hinge is concerned which flanks or borders the bending zone 24.

In the locking elements 12 represented in the figures, the lock-up body 14 as such respectively is free from hinge portions and bending sections and thus forms a rigid body.

As illustrated in the figures, the lock-up body 14 preferably is free from portions which extend beyond said tangent line 29A at said surface 29. Such portions may hamper the coupling. As in the examples, the lock-up body preferably, however, has a widened cross-section at the extremity 16 having the locking portion 17, wherein this widening results in a protrusion 43 at the side of the lock-up body 14 opposite to the surface 29 which comes into contact with the upper edge 30 of the panel 1 to be coupled thereto.

Due to the presence of the hook-shaped protrusion 31 and the protrusion 43, at the extremities 16 and 20, respectively, the locking elements 12 of the figures have a concave side directed towards the recess 13, whereas the surface 29 at the side of the locking element directed away from the recess 13 preferably, as in the examples, is made convex. FIG. 5 shows that the concave side in the respective condition can cooperate with the attachment portion 15, which allows an additional stabilization of the locking element 12 during the coupling movement M. In the example of FIG. 5, the protrusion 43 at the extremity 16 rests with the locking portion 17 on top of the attachment portion 15.

It is also noted that, where within the scope of the invention a vertical direction is mentioned, such as a locking in vertical direction, in fact reference is made to floor panels. In general, this means the direction perpendicular to the plane of the panels, independent of the fact whether this relates to floor panels, ceiling panels, wall panels or other panels. Where a horizontal direction is mentioned, such as a locking in horizontal direction, this also refers to floor panels. In general, this means the direction in the plane of the panels and perpendicular to the respective edge of the panel. Where a downward movement is mentioned, this generally means a movement of the male coupling part towards the female coupling part in a direction extending crosswise to the plane of the panels. Such movement on one pair of sides preferably is obtained such as illustrated in FIG. 8, namely by performing an angling movement W at the second pair of sides. When upward-directed or downward-directed is mentioned, then this generally means directed towards the decorative side, directed away from the decorative side, respectively.

It is clear that by the usable surface of a panel the surface is meant which is visible or usable in the final covering, which consists of a plurality of such coupled-together panels. Thus, in other words, this relates to the surface of the decorative side of the panels. Further, it is clear that various ones of said independent aspects can also be applied with other separate strips with lock-up function in vertical direction than strips with pivotable lock-up bodies. For example, the invention can also be applied with strips comprising a lock-up body which can be shifted in horizontal direction. When lock-up bodies are mentioned which are directed upward, downward, respectively, this then relates to a distal surface of the lock-up body, which surface, seen from the bottom towards the top, is directed outward, inward, respectively.

It is also noted that, in the cases in which the pivotable lock-up body 14 of a locking element 12 is directed upward with its locking portion 17, it is particularly advantageous for the smoothness of the coupling when the center line C of the lock-up body 14, in the non-coupled condition, encloses an angle A1 of less than 60°, and still better of less than 50°, with the horizontal or the upper surface of the panels 1, even when the measures of the invention mentioned in the introduction are not applied.

Therefore, it is clear that the present application also relates to a second independent invention, which can be defined as a panel, which, at least at two opposite sides 2-3, comprises coupling parts 4-5 with which two of such panels 1 can be brought in a coupled condition; wherein these coupling parts 4-5 form a horizontally active locking system 6 and a vertically active locking system 7; wherein the horizontally active locking system 6 comprises a male part 8 and a female part 9, which allow that two of such panels 1 can be connected to each other at said sides 2-3 by providing one of these panels 1 with the pertaining male part 8, by means of a downward movement M, in the female part 9 of the other panel 1; wherein the vertically active locking system 7 comprises a locking element 12, which, in the form of an insert, is provided in the side 2 which is provided with the male part 8; wherein this locking element 12 comprises at least a pivotable lock-up body 14; and wherein the lock-up body 14, at one extremity, forms a stop-forming locking portion 17, which can cooperate with a locking portion 18 of a similar coupled panel 1, wherein the locking element consists of a strip which is attached in a recess 13 in the panel 1, with the characteristic that said pivotable lock-up body 14 is directed upward with the extremity which forms the stop-forming locking portion 17 and that the pivotable lock-up body 14, in the non-coupled condition of two of such panels 1, adopts an orientation wherein the center line C of the lock-up body 14 encloses an angle of 60° or less with the horizontal or the upper surface of the panels 1. It is clear that the FIGS. 2 to 11 give an example of a possible embodiment of this second independent invention. Preferably, the center line C, in the coupled condition of two of such panels 1, encloses a larger angle A4 with the horizontal; preferably, the difference between the angle A1 in the non-coupled and the angle A4 in the coupled condition is at least 5° and still better more than 10°.

Preferably, the pivotable lock-up body 14 of the second independent invention, in the non-coupled condition, has a surface 29 which, when performing said downward movement M, comes into contact with the upper edge 30 of the other panel 1, wherein this surface 29, upon realization of the contact in the contact point has a tangent line 29A forming an angle A2 of 20° to 45° with the horizontal or the upper surface of the panels 1.

It is clear that the panels 1 of the second independent invention can show the characteristics of one or more preferred embodiments of the invention mentioned in the introduction without thereby necessarily having to apply the measures mentioned there.

It is also mentioned that FIG. 3 also illustrates a preferred characteristic wherein, in non-coupled condition, a line 44 defined by, on the one hand, the tangent point 45 of the horizontal tangent line through the support portion 21, and, on the other hand, the center point 46 of the stop-forming locking portion 17, encloses an angle A3 with the horizontal or the panel surface of less than 60°, less than 50° or, still better even, of less than 45° or of approximately 40° with the panel surface. Herein, it is noted that the position of the center point 46 of the stop-forming locking portion 17 is determined in coupled condition, whereas said line 44 and the orientation associated therewith, more particularly the angle A3 which is enclosed with the horizontal or the upper surface, as such is determined in the non-coupled condition.

Figure 12:
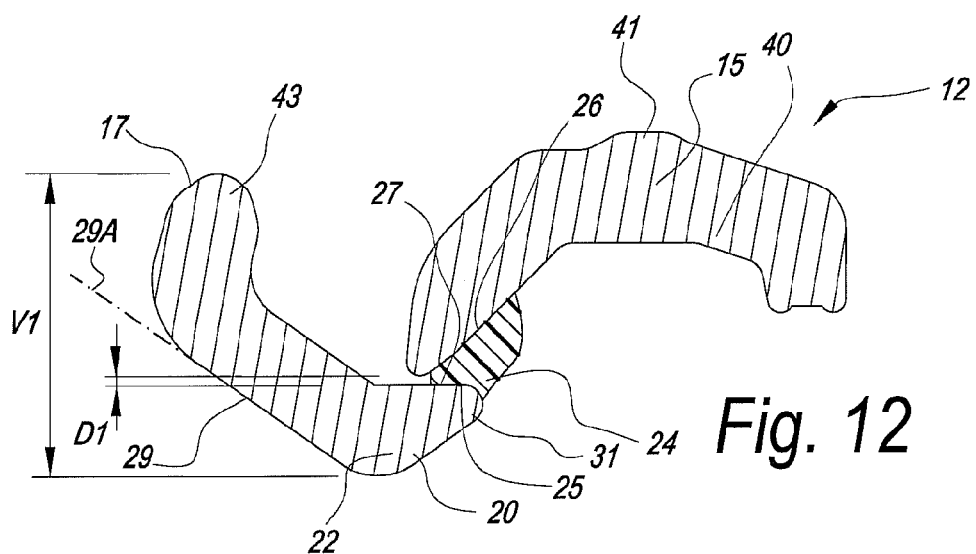
FIGS. 12 and 13, in views similar to those of FIGS. 7 and 3, respectively, represent another variant.
Figure 13:
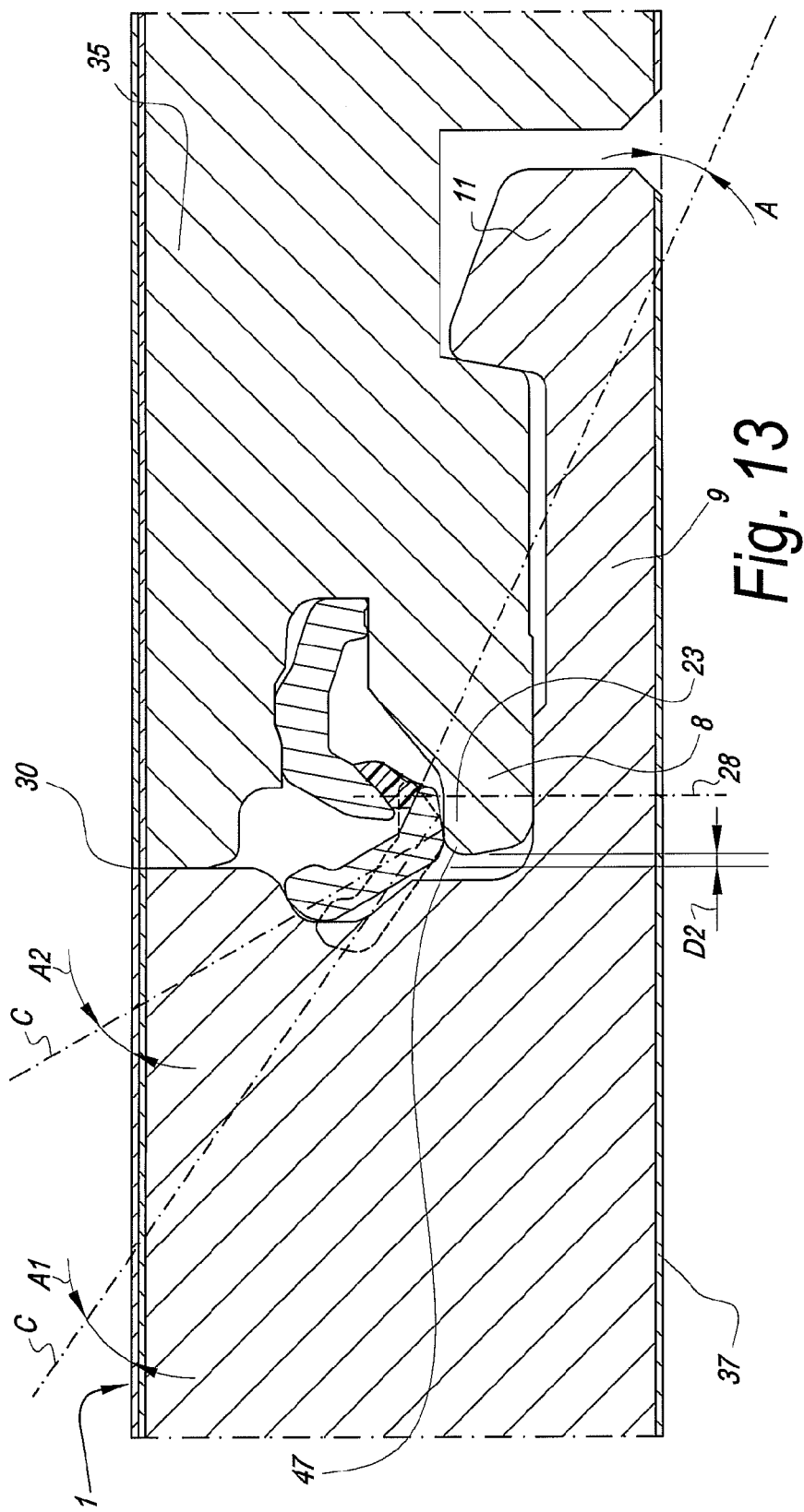

FIGS. 12 and 13 represent another variant of a locking element 12 and floor panels 1 in which such locking element 12 is applied. It is clear that this example shows the characteristics of the invention mentioned in the introduction as well as of the above-mentioned second independent invention. Further, it is clear that the example combines the characteristics of different preferred embodiments. For example, the lock-up body 14 in the coupled condition adopts an orientation wherein the center line C thereof forms an angle A4 with the panel surface which is larger than the angle A1 formed in the non-coupled condition. The difference between both angles is more than 10°. In this case, the difference is approximately 25°. In the coupled condition, the angle A4 is more than 50°, however, less than 90°. In this case, the angle A4 is approximately 60° and the angle A1 approximately 35°. Further, the first boundary surface 25, in coupled condition, encloses an angle A of less than 45°, in this case approximately 25°, with the upper surface of the panels 1.

The locking element of FIG. 12 further shows the particular characteristic that, at the location of the minimum vertical distance D1, a space is situated between the attachment portion 15 and the lock-up body 14.

The embodiment of the panels 1, such as illustrated by means of FIG. 13, further also shows the particular characteristic that the distal extremity 47 of the support portion 23 only extends up to a distance D2 from the upper edge 30 and thus does not pass beyond the upper edge 30. This characteristic can be applied in any panel with the characteristics of the invention and/or the second independent invention. Hereby, it is achieved that a smooth assembly remains possible even with not straight-angled floor panels. The distance D2 preferably is between 0.1 and 0.5 millimeters.

It is also noted that there where the vertical distance D1 is mentioned, this relates to the minimum vertical distance between parts of the lock-up body 14 and the attachment portion 15 which are located on the same vertical line. At the location of this vertical distance, a space may or may not be located between the lock-up body 14 and the attachment portion 15.

The present invention is in no way restricted to the embodiments described by way of example and represented in the figures; on the contrary, such panels may be realized in various forms and dimensions without leaving the scope of the invention.

The invention claimed is:

1. A panel, which, at least at two opposite sides, comprises coupling parts, with which two of such panels can be brought in a coupled condition;
   wherein said coupling parts form a horizontally active locking system and a vertically active locking system;
   wherein the horizontally active locking system comprises a male part and a female part, which allow that two of such panels can be connected to each other at said sides by providing one of these panels with the pertaining male part, by means of a downward movement, in the female part of the other panel;
   wherein the vertically active locking system comprises a locking element, which, in the form of an insert, is provided in one of the respective sides;
   wherein this locking element comprises at least a lock-up body; wherein the lock-up body, at one extremity, forms a stop-forming locking portion, which can cooperate with a locking portion of a similar coupled panel; wherein the locking element includes a strip attached in a recess in the panel, the locking element including an attachment portion which retains the strip in the recess, and the locking element also including a bending zone of a material different from the material of the lock-up body, the bending zone comprising a first boundary surface with said lock-up body and a second boundary surface with said attachment portion;
   wherein said lock-up body and the attachment portion, in the non-coupled condition, extend in a horizontal direction at least for a part vertically underneath each other,
   wherein points of the first boundary surface and the second boundary surface are situated on a vertical line one above the other, and wherein said first boundary surface for at least a portion of said part, in said non-coupled condition of the panels, extends in a direction forming an angle of less than 30° with an upper surface of the panels.

2. The panel of claim 1, wherein said lock-up body and the attachment portion, in a condition wherein said lock-up body is located completely underneath the upper side of the panel in which it is attached, extend underneath each other at least for a part, wherein points of the first boundary surface as well as of the second boundary surface, in this condition, are situated on a vertical line one above the other, and wherein said first boundary surface, in this condition and at least for a portion of said part extends in a direction which encloses an angle of less than 45° with the upper surface of the panels.

3. The panel of claim 1, wherein said lock-up body and the attachment portion, in the coupled condition of two of such panels, at least for a part extend underneath each other, wherein points of the first boundary surface as well as of the second boundary surface, in this condition, are situated on a vertical line one above the other, and wherein said first boundary surface, in this condition and at least for a portion of said part extends in a direction which encloses an angle of less than 45° with the upper surface of the panels.

4. The panel of claim 1, wherein said lock-up body relates to a pivotable lock-up body.

5. The panel of claim 1, wherein said bending zone relates to an elastic bending zone which forms a connection between the attachment portion and the lock-up body.

6. The panel of claim 1, wherein the locking element comprises a coextruded synthetic material strip with, seen in cross-section, a plurality of zones of synthetic material with different characteristics including at least a first zone formed by said lock-up body, and at least a second zone formed by said bending zone.

7. The panel of claim 1, wherein the respective parts of said lock-up body and said attachment portion extend underneath each other in such a manner that they herein, in the condition concerned, maintain a vertical distance between each other.

8. The panel of claim 1, wherein said locking element is provided as an insert in a recess in said male part and wherein said lock-up body is directed upward.

9. The panel of claim 8, wherein said first boundary surface, at least in the non-coupled condition, extends vertically underneath said second boundary surface.

10. The panel of claim 1, wherein the lock-up body, opposite to the part which forms the locking portion, comprises a support portion, which is rotatable against a support surface pertaining to the respective floor panel, wherein, in the coupled condition of two of such panels, said support surface extends in horizontal direction at least for a part vertically underneath said first boundary surface.

11. The panel of claim 1, wherein said lock-up body, in the non-coupled condition, adopts an orientation which forms an angle of less than 50° with the panel surface.

12. The panel of claim 1, wherein the lock-up body as such is free from hinge portions and bending sections.

13. The panel of claim 1, wherein the panel has a thickness of 15 millimeters or less.

14. The panel of claim 1, wherein the panel substantially is composed of a core material and a decorative top layer.

15. The panel of claim 1, wherein at least a portion of the locking element is provided in a recess and that, in the non-coupled condition, it is located with its locking portion completely outside of the recess.

16. The panel of claim 1, wherein the lock-up body defines a hook-shaped protrusion at the underside thereof and extending from the locking portion such that the first boundary surface for at least a portion of said part is formed by the hook-shaped protrusion.

17. The panel of claim 16, wherein the locking portion extends at an oblique angle from the hook-shaped protrusion.

18. The panel of claim 16, wherein the hook-shaped protrusion is located at an extremity of the lock-up body.

19. The panel of claim 16, wherein the hook-shaped protrusion is formed at a first extremity of the lock-up body and a protrusion is formed at a second extremity of the lock-up body, the hook-shaped protrusion and the protrusion form a concave side of the lock-up body, whereas a side opposite the concave side is convex.

20. The panel of claim 16, wherein the hook-shaped protrusion is located underneath at least a portion of the bending zone such that as the lock-up body rotates relative to the attachment portion between coupled and non-coupled conditions, at least a portion of the hook-shaped protrusion remains underneath the bending zone along the first boundary.

* * * * *